(12) United States Patent
De Raad et al.

(10) Patent No.: US 10,435,248 B2
(45) Date of Patent: Oct. 8, 2019

(54) RECIPROCATING SLAT CONVEYOR WITH PROTECTED SEAL

(71) Applicant: Cargo Mac B.V., Coevorden (NL)

(72) Inventors: Frans Arian Heino De Raad, Coevorden (NL); Nicolaas Marc Mater, Coevorden (NL)

(73) Assignee: CARGO MAC B.V. (NL)

( * ) Notice: Subject to any disclaimer, the term of this patent is extended or adjusted under 35 U.S.C. 154(b) by 0 days.

(21) Appl. No.: 15/987,802

(22) Filed: May 23, 2018

(65) Prior Publication Data
US 2018/0339862 A1 Nov. 29, 2018

Related U.S. Application Data

(60) Provisional application No. 62/510,667, filed on May 24, 2017.

(30) Foreign Application Priority Data

May 24, 2017 (NL) .................................. 2018975

(51) Int. Cl.
| | | |
|---|---|---|
| *B65G 25/06* | (2006.01) | |
| *B62D 63/08* | (2006.01) | |
| *B60P 1/00* | (2006.01) | |

(52) U.S. Cl.
CPC ........... *B65G 25/065* (2013.01); *B62D 63/08* (2013.01); *B60P 1/003* (2013.01)

(58) Field of Classification Search
CPC ...... B65G 25/065; B65G 25/06; B65G 25/04; B62D 63/08; B60P 1/003; B60P 1/00; B60P 1/36

USPC .................. 198/750.3, 750.4; 414/525.9
See application file for complete search history.

(56) References Cited

U.S. PATENT DOCUMENTS

| | | | | |
|---|---|---|---|---|
| 5,125,502 A * | 6/1992 | Foster | ............... | B65G 25/065 198/750.3 |
| 5,540,322 A * | 7/1996 | Foster | ............... | B65G 25/065 198/750.3 |
| 5,655,645 A * | 8/1997 | Foster | ............... | B65G 25/065 198/750.3 |
| 6,651,806 B2 * | 11/2003 | Hallstrom | ............ | B65G 25/065 198/750.3 |
| 7,152,729 B2 * | 12/2006 | Wilkens | ............... | B65G 25/065 198/750.4 |
| 7,510,072 B1 * | 3/2009 | Wilkens | ............... | B65G 25/065 198/750.3 |

(Continued)

*Primary Examiner* — Mark A Deuble
(74) *Attorney, Agent, or Firm* — Hayes Soloway P.C.

(57) ABSTRACT

The invention relates to a reciprocating slat conveyor multiple parallel slats that are slidable in the longitudinal direction, wherein the slats comprise subsequently alternating a first slat and a second slat, wherein the first slats comprise a horizontal upper wall section and an upright end wall section, and wherein the second slats comprise a horizontal upper wall section and a vertically upright wall section, wherein the upright wall section outwardly merges into an overhanging wall section that extends over the end wall section of the adjacent first slat, wherein the overhanging wall section merges into a vertically downwardly pending end wall section that extends aside the end wall section of the adjacent first slat, wherein a seal is present between the upright wall section and the end wall section of the second slat.

22 Claims, 8 Drawing Sheets

(56) References Cited

U.S. PATENT DOCUMENTS

| | | | | |
|---|---|---|---|---|
| 8,424,674 B2 * | 4/2013 | Drago | ............... | B65G 25/065 198/750.2 |
| 2006/0180439 A1 * | 8/2006 | Foster | ............... | B65G 25/065 198/750.3 |
| 2007/0170042 A1 * | 7/2007 | Foster | ............... | B65G 25/065 198/750.3 |

* cited by examiner

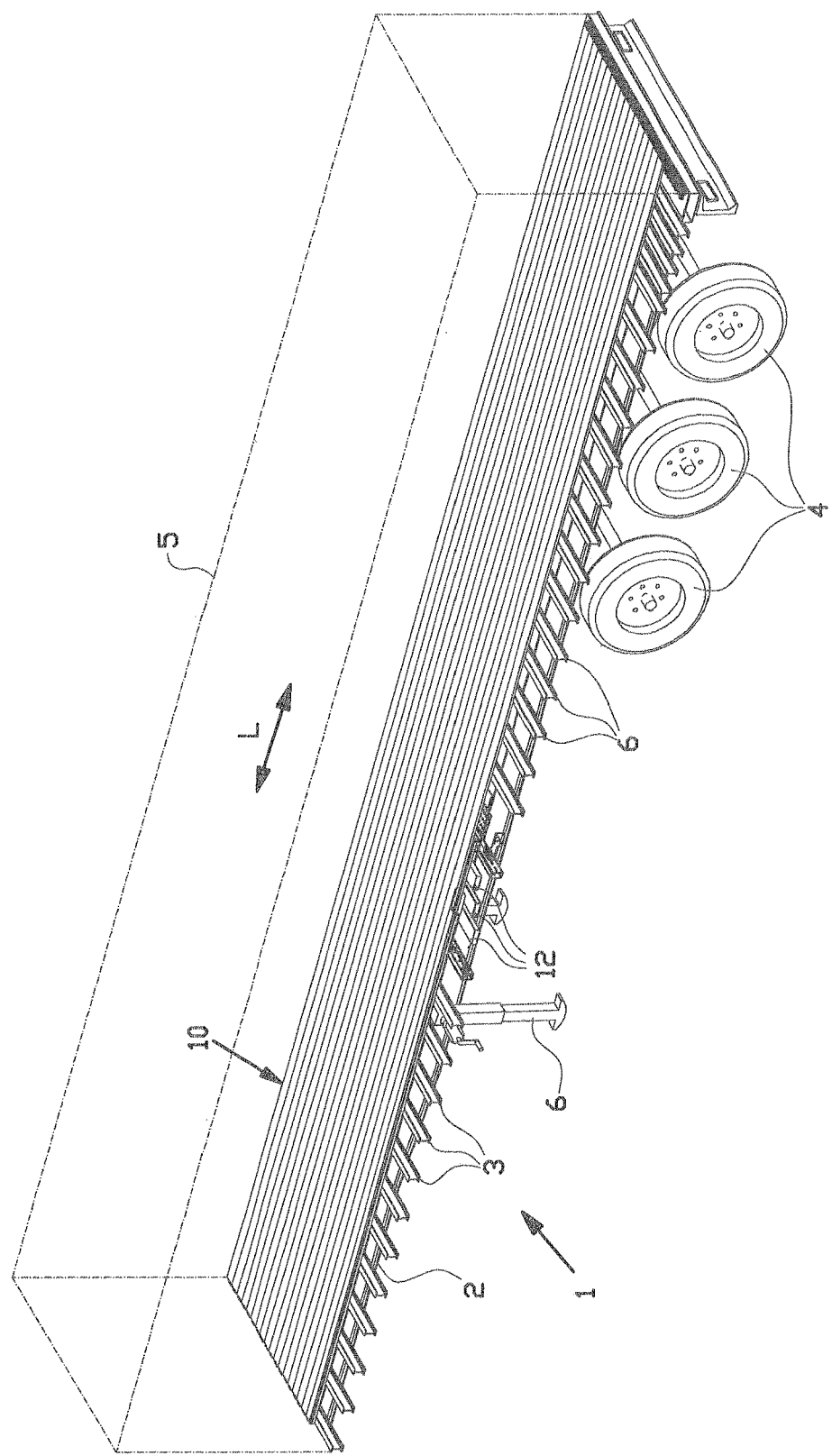

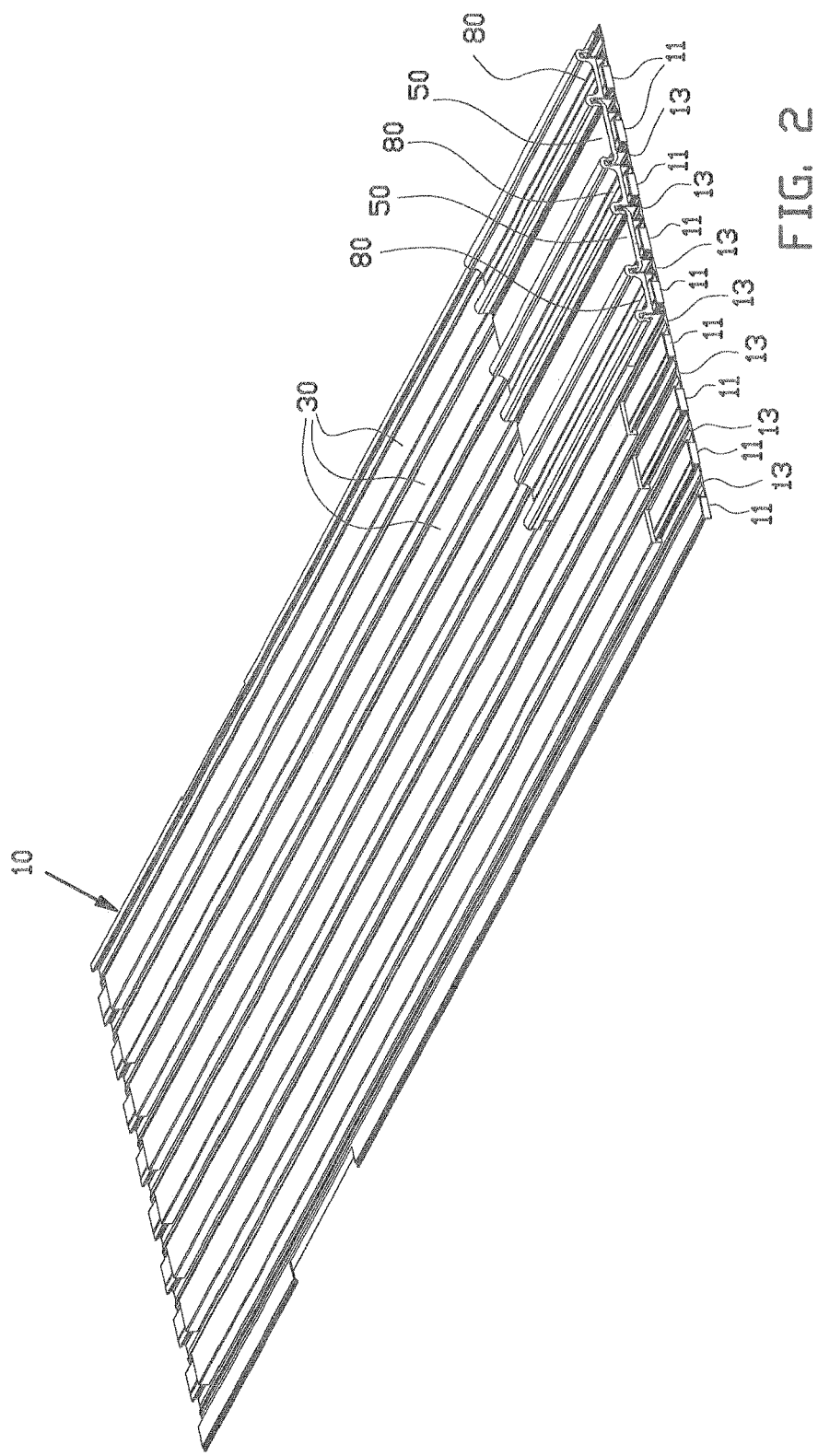

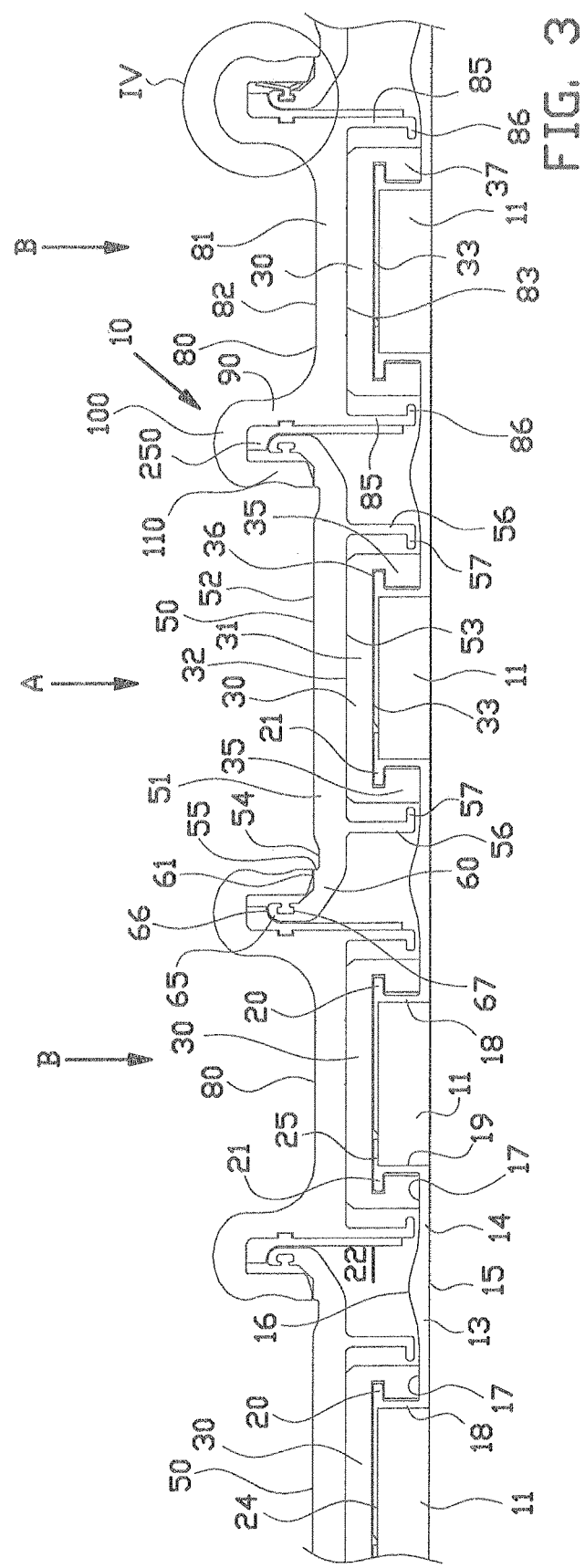

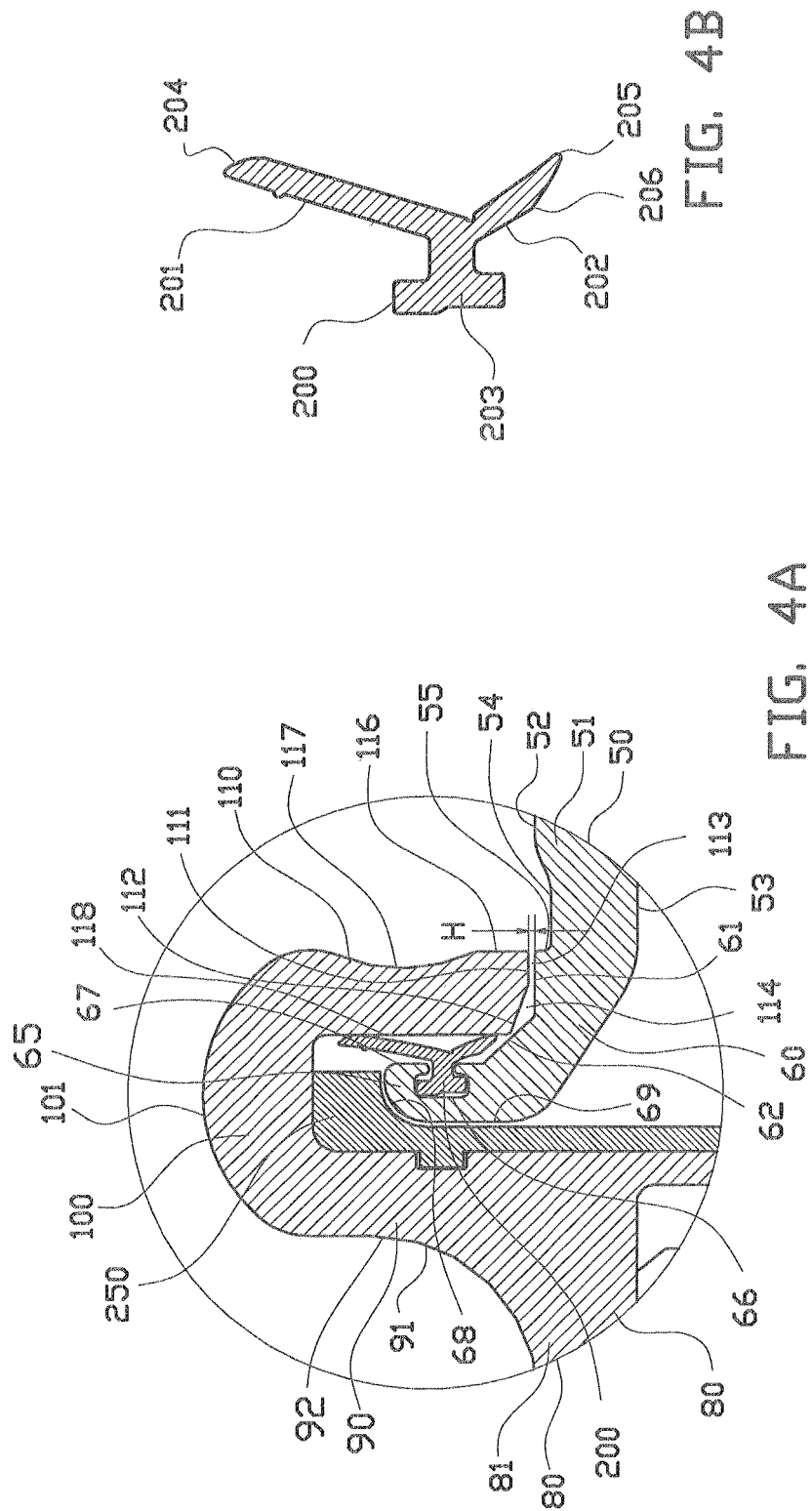

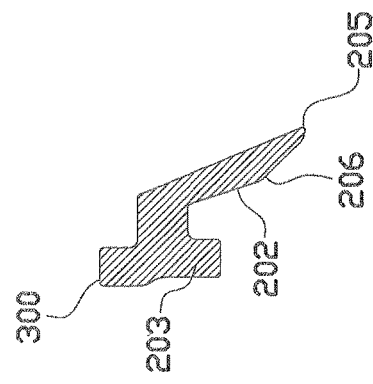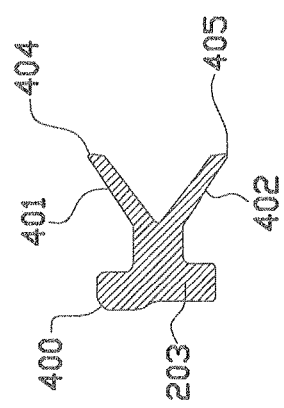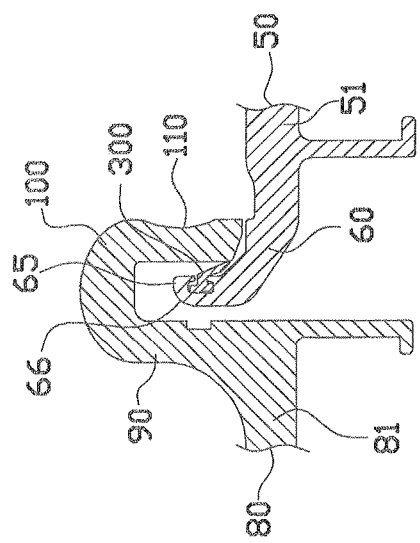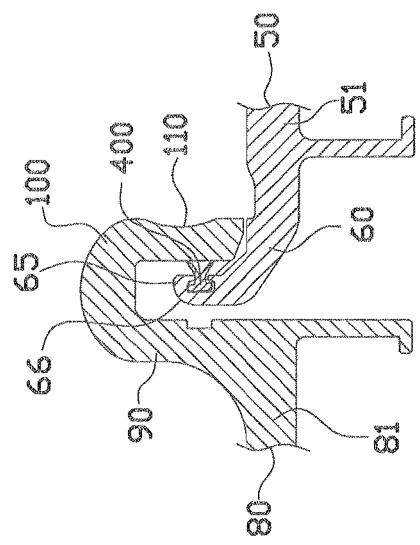

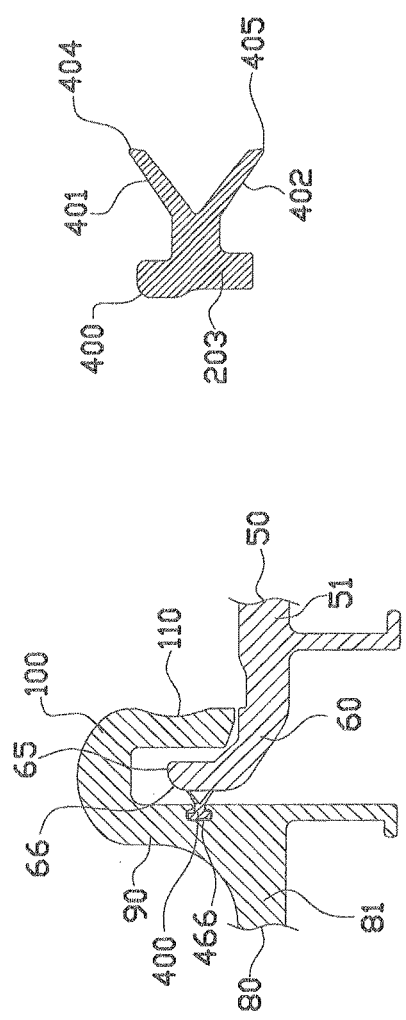
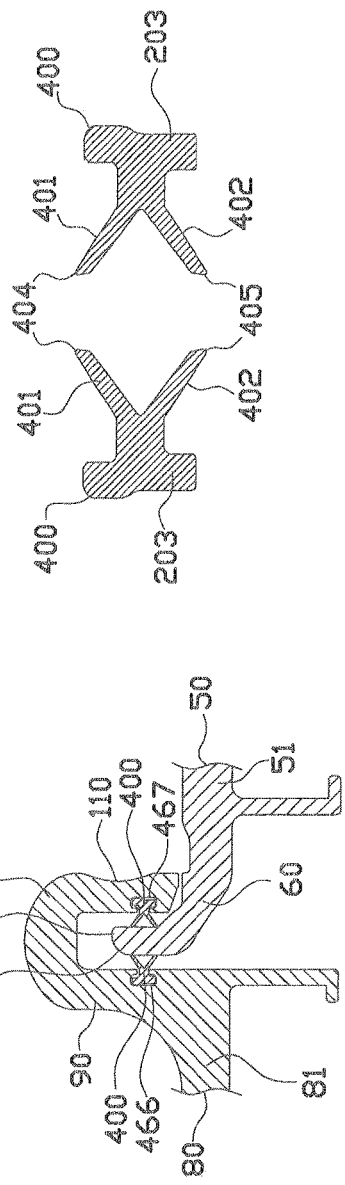

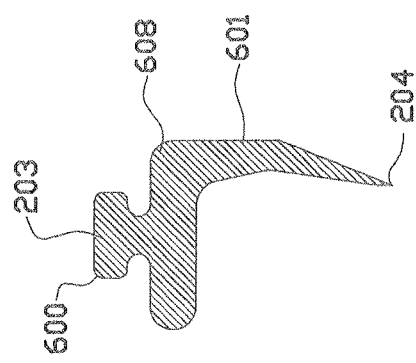
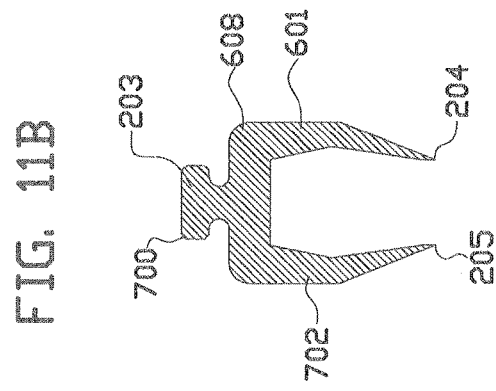
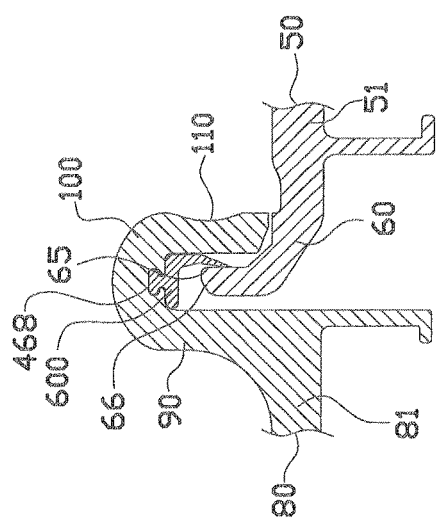
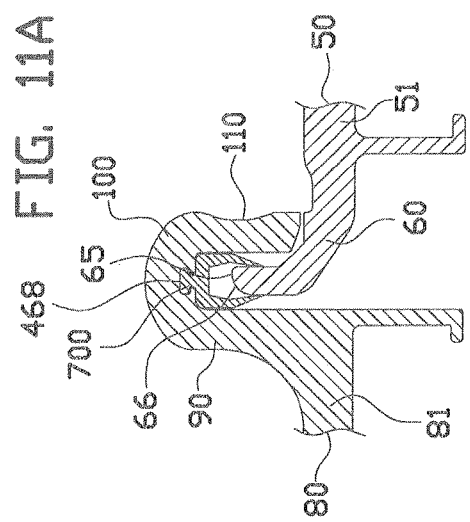

RECIPROCATING SLAT CONVEYOR WITH PROTECTED SEAL

CROSS REFERENCE TO RELATED APPLICATION

The subject application claims benefit of U.S. Provisional Application Ser. No. 62/510,667 filed May 24, 2017, titled "Reciproctating Slat Conveyor with Protected Seal," the entire disclosure of which is incorporated herein by reference.

BACKGROUND

The invention relates to a reciprocating slat conveyor comprising multiple parallel slats that are slidable in the longitudinal direction with respect to each other by means of a drive mechanism. Such reciprocating slat conveyors are able to load and unload cargo without additional loading equipment on the reciprocating slat conveyor.

Reciprocating slat conveyors for bulk goods have seals present between the slats to prevent clogging of particles between the slats. For bulk goods with abrasive particles the seals may be rigid to be highly resistant against wear. However the sealing capacity of rigid seals may not be optimal when also fine abrasive particles or liquid are present in the bulk goods.

It is an object of the present invention to provide a reciprocating slat conveyor of the abovementioned type, that is highly resistant against fine abrasive particles or liquids.

SUMMARY OF THE INVENTION

The invention provides a reciprocating slat conveyor comprising a support structure or subdeck, multiple parallel slats that are supported by the support structure and that are slidable in the longitudinal direction with respect to the support structure, and a drive system for reciprocating sliding movement of the slats with respect to the support structure, wherein the slats comprise subsequently alternating a first slat and a second slat, wherein the first slats comprise a horizontal upper wall section and a vertically upright end wall section along one of the longitudinal sides of the upper wall section, and wherein the second slats comprise a horizontal upper wall section and a vertically upright wall section along one of the longitudinal sides of the upper wall section, wherein the upright wall section outwardly merges into an overhanging wall section that extends over the upright end wall section of the adjacent first slat, wherein the overhanging wall section merges into a vertically downwardly pending end wall section that extends aside the upright end wall section of the adjacent first slat, wherein a seal is present between the first slat and the second slat that extends between the upright wall section and the downwardly pending end wall section of the second slat.

The reciprocating slat conveyor according to the invention comprises a first slat with an upright wall section that is enclosed by the vertically upright wall section, the overhanging wall section and the vertically downwardly pending end wall section of the second slat where the seal is located in between. In this reciprocating slat conveyor the seal is fully protected while an upwardly directed labyrinth is formed towards the seal. In this manner a seal can be provided to fully close off the adjacent slats.

In an embodiment the downwardly pending end wall section of the second slat extends spaced apart from the first slat to define a resistance channel in between that extends in the longitudinal direction over the overlap of the first slat and second slat. The resistance channel enables smooth mutual sliding movement of the first slat with respect to the second slat, while the passage of particles there through remains acceptable.

In an embodiment thereof the resistance channel extends under the downwardly pending end wall section of the second slat horizontally towards the upright end wall section of the first slat.

In a first practical embodiment the resistance channel has a height of maximal 2 millimeter.

In a preferred second practical embodiment resistance channel has a height of maximal 1 millimeter.

In a preferred third embodiment the resistance channel has a height of maximal 0.5 millimeter.

In an embodiment the downwardly pending end wall section of the second slat extends spaced apart from the first slat to define an accumulation channel in between that extends in the longitudinal direction over the overlap of the first slat and second slat, wherein the accumulation channel forms a continuation of the resistance channel that widens towards the upright end wall section of the first slat. The accumulation channel allows temporarily accumulation of particles that have penetrated the resistance channel so as to protect the seal.

In an embodiment thereof the accumulation channel is directed obliquely upwards towards the upright end wall section of the first slat to prevent further passage of penetrated particles by the action of gravity.

In an embodiment the upper wall section of the first slat comprises a straight upper surface and a lower gutter, wherein the gutter extends along the entrance of the resistance channel. The gutter forms a barrier for small particles that tend to move into the resistance channel.

In an embodiment thereof the downwardly pending end wall section of the second slat and the gutter of the first slat each comprise a vertically extending surface along the entrance of the resistance channel to effectively resist particles to enter the resistance channel.

In an embodiment thereof the vertically extending surfaces are mutually aligned.

In an embodiment the first slats comprise upright end wall sections along the opposite longitudinal sides of the upper wall section, and wherein the second slats comprise vertically upright wall sections along the opposite longitudinal sides of the upper wall section, wherein the vertically upright wall sections outwardly merge into overhanging wall sections that extend over the upright end wall sections of the adjacent first slats, wherein the overhanging wall sections merge into vertically downwardly pending end wall sections that extend aside the upright end wall sections of the adjacent first slats, wherein seals are present between the first slats and second slats that extend between the upright wall sections and the downwardly pending end wall sections of the second slats. In this configuration it is possible to remove only one second slat, for example when this one needs to be replaced. When a first slat needs to be removed, only the direct adjacent second slats needs to be removed.

In an embodiment the seal comprises a base body that is mounted to the upright end wall section of the first slat, and a first leg that is directed from the base body towards the downwardly pending end wall section of the second slat, wherein the first leg comprises an end tip that engages the downwardly pending end wall section of the second slat. The first flexible leg causes that the end tip is pressed against the second slat when penetrating particles or liquids act against the first leg.

In an embodiment thereof the first leg is directed downwards from the base body to the downwardly pending end wall section of the second slat, whereby upcoming penetrating particles may push the end tip stronger against the second slat.

In an embodiment thereof the first leg is supported by the upright end wall section of the first slat between the base body and the end tip, whereby it may be biased against the second slat.

In an embodiment the seal comprises a base body that is mounted to the upright end wall section of the first slat, and a second leg that is directed upwards from the base body towards the downwardly pending end wall section of the second slat, wherein the second leg comprises an end tip that engages the downwardly pending end wall section of the second slat. The second leg may be in addition to the first leg.

In an embodiment the first leg is shorter than the second leg.

In an embodiment the seal comprises a base body that is mounted to the downwardly pending end wall section of the second slat, and a first leg that is directed from the base body towards the upright end wall section of the first slat, wherein the first leg comprises an end tip that engages the upright end wall section of the first slat. In this embodiment the seal is mounted to the second slat.

In an embodiment the first leg is directed downwards from the base body to the upright end wall section of the first slat.

In an embodiment the seal comprises a base body that is mounted to the downwardly pending end wall section of the second slat, and a second leg that is directed upwards from the base body towards the upright end wall section of the first slat, wherein the second leg comprises an end tip that engages the upright end wall section of the first slat.

In an embodiment the seal comprises a base body that is mounted to the upright wall section of the second slat, and a first leg that is directed from the base body towards the upright end wall section of the first slat, wherein the first leg comprises an end tip that engages the upright end wall section of the first slat.

In an embodiment thereof the first leg is directed downwards from the base body to the upright end wall section of the first slat.

In an embodiment the seal comprises a base body that is mounted to the upright wall section of the second slat, and a second leg that is directed upwards from the base body towards the upright end wall section of the first slat, wherein the second leg comprises an end tip that engages the upright end wall section of the first slat.

In an embodiment the seal comprises a base body that is mounted to the overhanging wall section of the second slat, and a first leg that is directed from the base body towards the upright end wall section of the first slat and that engages the upright end wall section of the first slat.

In an embodiment the seal is a flexible seal.

In an embodiment the reciprocating slat conveyor comprises a slide bearing that is mounted to the second slat under its overhanging wall section, wherein the second slat is at least partly supported by the adjacent first slat via the slide bearing. The slide bearing can keep the second slat well aligned with the first slat when bulk goods act thereon, whereby the performance of the seal is guaranteed.

In an embodiment thereof the slide bearing has a first section that extends above the upright end wall section of the first slat and that is slidable supported by the upright end wall section of the first slat, wherein the first section merges into a thinner second wall section that extends along the upright end wall section of the first slat.

In an embodiment the slide bearing comprises multiple slide bearing profiles that are distributed spaced apart from each other in the longitudinal direction of the second slat.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which:

FIG. 1 shows a trailer with a reciprocating slat conveyor according to an embodiment of the invention;

FIG. 2 shows the part of the reciprocating slat conveyor as indicated in FIG. 1, wherein some components have been removed for illustrative purposes;

FIG. 3 shows a cross section of the reciprocating slat conveyor of FIG. 1;

FIGS. 4A and 4B show details of the cross section of FIG. 3 at the first configuration of the seal of the reciprocating slat conveyor; and FIGS. 5A and 5B, 6A and 6B, 7A and 7B, 8A and 8B, 9A and 9B, 10A and 10B, 11A and 11B, and 12A and 12B show details of the cross section of FIG. 3 with alternative configurations of the seal.

DETAILED DESCRIPTION OF THE INVENTION

Figure 9A:
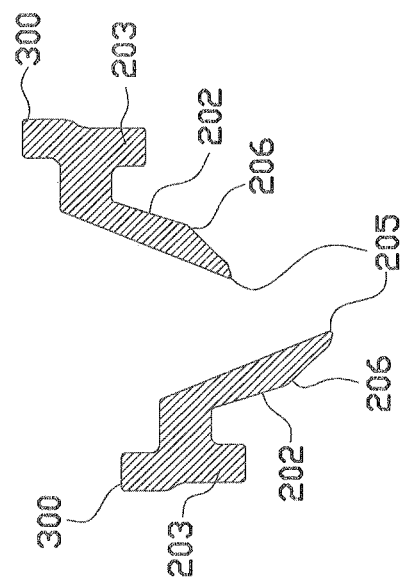

FIG. 1 shows a trailer 1 with a reciprocating slat conveyor 10 according to an embodiment of the invention. The trailer 1 comprises two longitudinal frame bars 2 and multiple transverse frame bars 3 mounted thereon, and a schematically indicated hood 5 that covers the area above the reciprocating slat conveyor 10. The trailer 1 furthermore comprises multiple wheel axes 4, and two retractable stands 6 to support the uncoupled trailer 1. The reciprocating slat conveyor 10 according to the invention is not limited to trailer applications, but can also be applied in trucks or in fixed structures. The reciprocating slat conveyor 10 is configured to move cargo forwards and backwards in its longitudinal direction L as described hereafter.

The reciprocating slat conveyor 10 is shown in more detail in FIGS. 2 and 3. The reciprocating slat conveyor 10 comprises multiple parallel prismatic first subdeck profiles 11 with a rectangular cross section that are mounted parallel to each other and spaced apart from each other to the transverse frame bars 3, and separate thereof multiple adjacent prismatic second subdeck profiles 13 that cover and bridge the first subdeck profiles 11. In this embodiment the first subdeck profiles 11 and the second subdeck profiles 13 form a support structure of the reciprocating slat conveyor 10.

As best shown in FIG. 3, the second subdeck profiles 13 comprise a horizontal bottom wall section 14 with a straight bottom surface 15, and with a centrally located convex curved upper surface section 16 and adjacent straight surface sections 17. The bottom wall section 14 merges at the longitudinal sides into a first upright wall section 18 and a second upright wall section 19. These upright wall sections 18, 19 merge into a first end flange 20 and a second end flange 21 that extend parallel to the bottom surface 15. The first end flange 20 and the second end flange 21 are inwardly directed to bound an insert space 22 of the second subdeck profile 13 above the curved upper surface section 16. The upright wall sections 18, 19 also merge into a first support wall 24 and a shorter second support wall 25 that are outwardly directed and that rest onto the subsequent first subdeck profiles 11 to entirely cover these.

As best shown in FIGS. 2 and 3, the reciprocating slat conveyor 10 comprises multiple slide bearing profiles 30 that extend above the first subdeck profiles 11. The slide bearing profiles 30 each comprise an upper wall section 31 with a straight upper surface 32 and a straight bottom surface 33, wherein the bottom surface 33 contacts the first support wall 24, the second support wall 25 and the adjacent first end flange 20 and the second end flange 21 of the meeting second subdeck profiles 13. The upper wall section 31 merges along the longitudinal sides into a vertically downwards pending side wall sections 35 having inner grooves 36 that face each other and in which the first end flange 20 and the second end flange 21 are inserted by sliding the slide bearing profile 30 in its longitudinal direction over the respective first subdeck profile 11.

The reciprocating slat conveyor 10 comprises first slats 50 and second slats 80 that are subsequently alternating in the transverse direction. The subsequent slats 50, 80 form repetitively and subsequently part of a first group, a second group or a third group of slats and are per group connected to a drive beam that is not shown and that extend transversely below the first subdeck profiles 11. The drive beams form part of an hydraulic drive system that is known per se and therefore not shown in the drawings. This hydraulic drive system is configured to shift one of the groups of slats 50, 80 in the longitudinal direction L with respect to the remaining groups of slats 50, 80 in subsequent cycles whereby cargo on the slats 50, 80 slides only in one loading direction or unloading direction.

As best shown in FIG. 3, the first slats 50 are prismatic profiles, comprising an horizontal upper wall section 51 having a straight upper surface 52 and a straight bottom surface 53. The bottom surface 53 is in sliding contact with the upper surface 32 of the supporting slide bearing profile 30. The first slats 50 comprise two downwardly pending legs 56 having inwardly directed edges 57 that are in sliding contact with the slide bearing profiles 30 and that hook behind the spring wall sections 42 of the retainers 40. The upper wall section 51 merges at its longitudinal sides into obliquely side wall sections 60 that are directed upwards and which subsequently merge into vertically upright end wall sections 65. As best shown in FIG. 4A, the upper wall section 51 comprises two gutters 54 along the oblique side wall sections 60, having a vertically upright surface section 55 at the side of the adjacent second slat 80. The oblique side wall sections 60 each comprise a horizontal surface section 61 along the gutters 54 that extends at the same height as the upper surface 52 of the upper wall section 51. This horizontal surface section 61 merges into an oblique straight inner surface section 62 of the oblique side wall section 60. The end wall sections 65 comprise a straight vertical inner surface section 67 that merges into the oblique inner surface section 62. In the end wall sections 65 a locking groove 66 is formed for a flexible seal 200 that extends along the length of the slat 50 to which it is mounted. The end wall sections 65 furthermore comprise a curved outer surface section 68 that downwardly merges into a vertically extending straight outer surface section 69.

The second slats 80 are prismatic profiles, comprising a horizontal upper wall section 81 having a straight upper surface 82 and a straight bottom surface 83. The bottom surface 83 is in sliding contact with the upper surface 32 of the supporting slide bearing profile 30. The second slats 80 comprise two downwardly pending legs 85 having inwardly directed edges 86 that are in sliding contact with the slide bearing profiles 30 and that hook behind the spring wall sections 42 of the retainers 40. The upper wall section 81 merges at the longitudinal sides into subsequently a vertically upright wall section 90, an overhanging wall section 100 and a downwardly pending end wall section 110 in the form of an inversed U with parallel legs having about the same length. The straight upper surface 82 merges over a quart circular curved upper surface section 91 into a vertically extending outer surface section 92 of the upright wall section 90. This outer surface section 92 merges into a substantially half circular curved upper surface section 101 of the overhanging wall section 100. The end wall sections 110 comprise a straight horizontal bottom surface section 111 that extends parallel to the horizontal surface section 61 of the engaged first slat 50 to form a resistance channel 113 with a constant height H of less than 2 millimeters, preferably less than 1 millimeter, most preferably 0.5 millimeter or less. The horizontal bottom surface section 111 merges inwardly into an oblique bottom surface section 112 that faces both the horizontal surface section 61 and the oblique surface section 62 of the engaged first slat 50 to form an outwardly diverging accumulation channel 114. The end wall sections 110 comprise a vertically extending lower outer surface section 116 that is aligned with the upright surface section 55 of the engaged first slat 50. At about half its height the end wall sections 110 comprise a convex surface section 117 between the curved upper surface section 101 and the outer surface section 116. At the inside, the end wall section 110 comprises a straight, vertically extending engagement surface 118 for the seal 200. The upright end wall section 65 of the first slats 50, and the upright wall section 90 and the adjacent downwardly pending end wall section 110 of the second slats 80 extend parallel to each other.

As shown in FIG. 4B, the flexible seals 200 comprise a base body 203 that is confined in the locking groove 66, and an obliquely downwards directed first leg 202 and a longer obliquely upwards directed second leg 201. The tips 204, 205 of the legs 201, 202 are in contact with the downwardly pending end wall section 110. The first leg 202 is also supported by the oblique inner surface section 62 at a corner edge 206 that projects towards the inner surface 62 whereby the first leg 102 is biased against the end wall section 110 of the second slat 80. The seals 200 are made of rubber or a rubber-like substance.

As shown in FIGS. 3 and 4A, the reciprocating slat conveyor 10 comprises slide bearing profiles 250 that are mounted to the second slats 80. The slide bearing profiles 250 are distributed spaced apart from each other over the length of the slats 80. The slide bearing profiles 250 comprise an outer surface that at one side matches the inner sides of the overhanging wall 100 and the upright wall section 90, and that at the opposite side matches the curved outer surface 68 and the straight outer surface 69 of the engaged upright end wall section 65 of the engaged first slat 50. A part of the load on the second slat profiles 80 is vertically transferred via the thicker upper section of the slide bearing profiles 250 to the engaged first slat profiles 50.

In this example the subdeck profiles 11, 14 and the slats 50, 80 are made of aluminium by extrusion. The slide bearing profiles 30, the retainers 40 and the slide bearing profiles 250 are made of plastic, such as ABS, PE or PP, by extrusion.

The reciprocating slat conveyor 10 is assembled by firstly installing the first slats 50 in vertical direction A onto their slide bearing profiles 30, wherein non shown retainers snap behind the first slats 50. Subsequently the second slats 80 are installed in the same manner in vertical direction B, wherein the slide bearing profiles 250 engage the installed first slats 50 and the seals 200 engage the second slats 80. When the reciprocating slat conveyor 10 needs to be partly disassembled, for example to replace only one of the slats 50, 80, it is in the case of a second slat 80 sufficient to lift and remove this one alone, or in the case of a first slat 50 to lift and remove only its directly adjacent second slats 80 first.

FIGS. 5A-12B show alternative configurations of the seal. The parts that correspond with earlier discussed parts are provided with the same reference numbers. Hereafter only the differences are discussed.

In the second configuration as shown in FIGS. 5A and 5B the seal 300 is provided with the downwardly directed first leg 202 only.

In the third configuration as shown in FIGS. 6A and 6B the seal 400 is provided with an obliquely downwards directed first leg 402 and an obliquely upwards directed second leg 401 that are symmetrical with respect to a horizontal plane through the center of the base body 203. The legs 402, 401 are only in contact with the engagement surface at their respective tips 405, 404.

In the fourth configuration as shown in FIGS. 7A and 7B, the second slat 80 is in its upright wall section 90 provided with a locking groove 466 in which the base body 203 of the seal 400 as shown in the third configuration is confined. The tips 405, 404 thereof engage the straight outer surface 69 of the first slat 50.

In the fifth configuration as shown in FIGS. 8A and 8B, the second slat 80 is in addition to the fourth configuration also in its downwardly pending end wall section 110 provided with a locking groove 467 in which the base body 203 of a second seal 400 as shown in the third configuration is confined. The tips 405, 404 of the second seal engage the upright end wall section 65, which is smooth and not provided with the locking groove 66 of the first configuration.

Figure 9B:
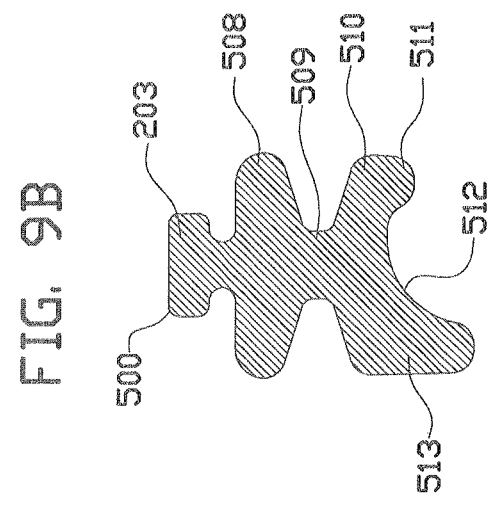

In the sixth configuration as shown in FIGS. 9A and 9B, the second slat 80 is in its upright wall section 90 and in its downwardly pending end wall section 110 provided with the locking grooves 466, 467 in which the seals 300 according to the second configuration are inserted.

Figure 10A:
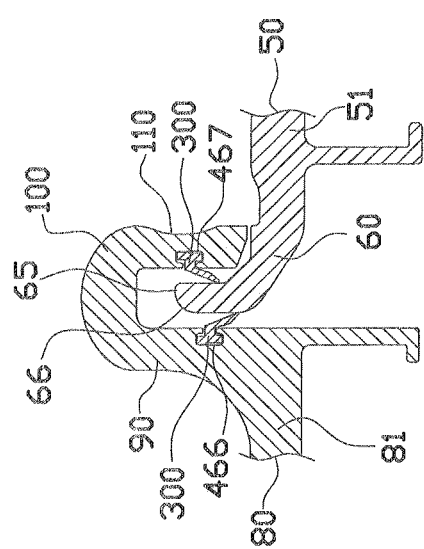
Figure 10B:
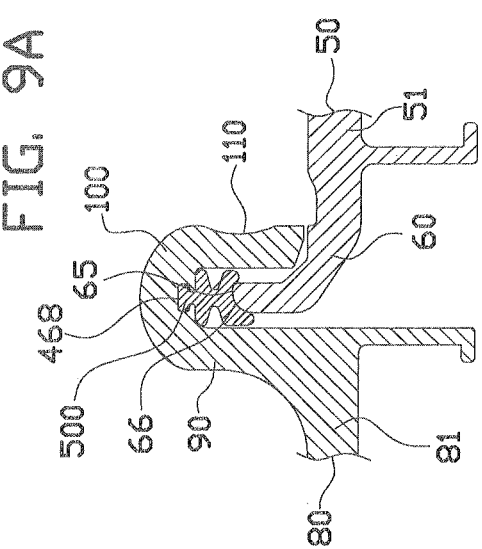

In the seventh configuration as shown in FIGS. 10A and 10B, the base body 203 of the seal 500 is confined in a locking groove 468 at the downwardly facing inner side of the overhanging wall section 100. The seal 500 comprises a support body 508 that is confined between the upright wall section 90 and the downwardly pending end wall section 110, a smaller flexible section 509, and an engagement section 510 that is confined between the upright wall section 90 and the downwardly pending end wall section 110. The engagement section 510 comprises a first leg 513 and a second leg 511 that merge into each other along a curvature 512 that corresponds with the curvature of the curved outer surface 68 of the upright end wall section 65. The engagement section 510 is biased against the curved outer surface 68.

In the eighth configuration as shown in FIGS. 11A and 11B, the base body 203 of the seal 600 is confined in the locking groove 468 in the inner side of the overhanging wall section 100. The seal 600 comprises a support body 608 that is confined between the upright wall section 90 and the downwardly pending end wall section 110, and a first leg 601 of which the tip 204 engages the upright end wall section 65.

In the ninth configuration as shown in FIGS. 12A and 12B, the base body 203 of the seal 700 is confined in the locking groove 468 in the inner side of the overhanging wall section 100. The seal 700 comprises the first leg 601 of which the tip 204 engages the upright end wall section 65, and a second leg 702 that is symmetrical to the first leg 601, and of which the tip 205 engages the upright end wall section 65 at the opposite side.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A reciprocating slat conveyor comprising a support structure or subdeck, multiple parallel slats that are supported by the support structure and that are slidable in the longitudinal direction with respect to the support structure, and a drive system for reciprocating sliding movement of the slats with respect to the support structure, wherein the slats comprise subsequently alternating a first slat and a second slat, wherein the first slats comprise a horizontal upper wall section and an upright end wall section along one of the longitudinal sides of the upper wall section, and wherein the second slats comprise a horizontal upper wall section and a vertically upright wall section along one of the longitudinal sides of the upper wall section, wherein the vertically upright wall section outwardly merges into an overhanging wall section that extends over the upright end wall section of the adjacent first slat, wherein the overhanging wall section merges into a vertically downwardly pending end wall section that extends aside the upright end wall section of the adjacent first slat, wherein a seal is present between the first slat and the second slat that extends between the upright wall section and the downwardly pending end wall section of the second slat.

2. The reciprocating slat conveyor according to claim 1, wherein the downwardly pending end wall section of the second slat extends spaced apart from the first slat to define a resistance channel in between that extends in the longitudinal direction over the overlap of the first slat and second slat.

3. The reciprocating slat conveyor according to claim 2, wherein under the downwardly pending end wall section of the second slat the resistance channel extends horizontally towards the upright end wall section of the first slat.

4. The reciprocating slat conveyor according to claim 2, wherein the downwardly pending end wall section of the second slat extends spaced apart from the first slat to define an accumulation channel in between that extends in the longitudinal direction over the overlap of the first slat and second slat, wherein the accumulation channel forms a continuation of the resistance channel that widens towards the upright end wall section of the first slat.

5. The reciprocating slat conveyor according to claim 4, wherein the accumulation channel is directed obliquely upwards towards the upright end wall section of the first slat.

6. The reciprocating slat conveyor according to claim 2, wherein the upper wall section of the first slat comprises a straight upper surface and a lower gutter, wherein the gutter extends along the entrance of the resistance channel.

7. The reciprocating slat conveyor according to claim 6, wherein the downwardly pending end wall section of the second slat and the gutter of the first slat each comprise a vertically extending surface along the entrance of the resistance channel.

8. The reciprocating slat conveyor according to claim 7, wherein the vertically extending surfaces are mutually aligned.

9. The reciprocating slat conveyor according to claim 1, wherein the first slats comprise upright end wall sections along the opposite longitudinal sides of the upper wall section, and wherein the second slats comprise vertically upright wall sections along the opposite longitudinal sides of the upper wall section, wherein the vertically upright wall sections outwardly merge into overhanging wall sections that extend over the upright end wall sections of the adjacent first slats, wherein the overhanging wall sections merge into vertically downwardly pending end wall sections that extend aside the upright end wall sections of the adjacent first slats, wherein seals are present between the first slats and second slats that extend between the upright wall sections and the downwardly pending end wall sections of the second slats.

10. The reciprocating slat conveyor according to claim 1, wherein the seal comprises a base body that is mounted to the upright end wall section of the first slat, and a first leg that is directed from the base body towards the downwardly pending end wall section of the second slat, wherein the first leg comprises an end tip that engages the downwardly pending end wall section of the second slat.

11. The reciprocating slat conveyor according to claim 10, wherein the first leg is directed downwards from the base body to the downwardly pending end wall section of the second slat.

12. The reciprocating slat conveyor according to claim 11, wherein the first leg is supported by the upright end wall section of the first slat between the base body and the end tip.

13. The reciprocating slat conveyor according to claim 1, wherein the seal comprises a base body that is mounted to the upright end wall section of the first slat, and a second leg that is directed upwards from the base body towards the downwardly pending end wall section of the second slat, wherein the second leg comprises an end tip that engages the downwardly pending end wall section of the second slat.

14. The reciprocating slat conveyor according to claim 1, wherein the seal comprises a base body that is mounted to the downwardly pending end wall section of the second slat, and a first leg that is directed from the base body towards the upright end wall section of the first slat, wherein the first leg comprises an end tip that engages the upright end wall section of the first slat.

15. The reciprocating slat conveyor according to claim 14, wherein the first leg is directed downwards from the base body to the upright end wall section of the first slat.

16. The reciprocating slat conveyor according to claim 1, wherein the seal comprises a base body that is mounted to the downwardly pending end wall section of the second slat, and a second leg that is directed upwards from the base body towards the upright end wall section of the first slat, wherein the second leg comprises an end tip that engages the upright end wall section of the first slat.

17. The reciprocating slat conveyor according to claim 1, wherein the seal comprises a base body that is mounted to the upright wall section of the second slat, and a first leg that is directed from the base body towards the upright end wall section of the first slat, wherein the first leg comprises an end tip that engages the upright end wall section of the first slat.

18. The reciprocating slat conveyor according to claim 17, wherein the first leg is directed downwards from the base body to the upright end wall section of the first slat.

19. The reciprocating slat conveyor according to claim 1, wherein the seal comprises a base body that is mounted to the upright wall section of the second slat, and a second leg that is directed upwards from the base body towards the upright end wall section of the first slat, wherein the second leg comprises an end tip that engages the upright end wall section of the first slat.

20. The reciprocating slat conveyor according to claim 1, wherein the seal comprises a base body that is mounted to the overhanging wall section of the second slat, and a first leg that is directed from the base body towards the end wall section of the first slat and that engages the end wall section of the first slat.

21. The reciprocating slat conveyor according to claim 1, wherein the seal is a flexible seal.

22. The reciprocating slat conveyor according to claim 1, comprising a slide bearing that is mounted to the second slat under its overhanging wall section, wherein the second slat is at least partly supported by the adjacent first slat via the slide bearing.

* * * * *